United States Patent
Canora et al.

[11] Patent Number: 6,009,247
[45] Date of Patent: Dec. 28, 1999

[54] PORTABLE COMPUTER NETWORK

[75] Inventors: Frank J. Canora, Millbrook, N.Y.; Michael Frank Cina, Elizabethtown, Pa.; Brian Paul Gaucher, New Milford, Conn.; Paul Francis Greier, Carmel, N.Y.; Richard Ian Kaufman, Somers, N.Y.; Alphonso Philip Lanzetta, Marlboro, N.Y.; Lawrence Shungwei Mok, Brewster, N.Y.; Robert Stephen Olyha, LaGrange, N.Y.; Saila Ponnapalli, Fishkill, N.Y.; John LeRoy Staples, Pleasantville, N.Y.

[73] Assignee: International Business Machines Corporation, Armonk, N.Y.

[21] Appl. No.: 08/739,248

[22] Filed: Oct. 29, 1996

[51] Int. Cl.⁶ ........................................... G06F 13/38
[52] U.S. Cl. .................. 395/309; 395/281; 395/856; 395/857; 395/200.57; 395/200.79; 395/200.8; 455/552
[58] Field of Search ...................... 395/281–283, 395/309, 856, 857, 858, 200.8, 200.57, 200.58, 200.79; 455/556–557

[56] References Cited

U.S. PATENT DOCUMENTS

| | | | |
|---|---|---|---|
| 4,812,842 | 3/1989 | Bayerlein et al. | 340/825.72 |
| 5,128,981 | 7/1992 | Tsukamoto et al. | 379/58 |
| 5,136,285 | 8/1992 | Okuyama | 340/870.11 |
| 5,204,768 | 4/1993 | Tsakiris et al. | 359/148 |
| 5,218,344 | 6/1993 | Ricketts | 340/573 |
| 5,291,193 | 3/1994 | Isobe et al. | 340/825.69 |
| 5,566,366 | 10/1996 | Russo et al. | 455/343 |
| 5,668,977 | 9/1997 | Swanstorm et al. | 395/500 |
| 5,696,903 | 12/1997 | Mahany | 395/200.58 |
| 5,732,360 | 3/1998 | Jarett et al. | 455/552 |
| 5,765,027 | 6/1998 | Wang et al. | 395/860 |
| 5,768,531 | 6/1998 | Lin | 395/200.72 |

OTHER PUBLICATIONS

Universal Wireless Connectivity for Portable Computers–IBM Technical Disclosure Bulletin vol. 37 No. 048 Apr. 1994 pp. 91–93.

*Primary Examiner*—Ayaz R. Sheikh
*Assistant Examiner*—Raymond N Phan
*Attorney, Agent, or Firm*—Daniel P. Morris; Alvin J. Riddles

[57] ABSTRACT

A portable or notebook type computer communication interface that permits portable computers to be reliably used in a data processing network. The interface involves communication circuitry, special device inputs and power monitoring and charging. A flexible portable computer wireless time and frequency division network is formed using a time and frequency division multiplexed communication channel assignment feature that together with a wireless link establishes a unique direct communication channel between data processing devices on different levels with data packet type transmission security. The principle permits each portable computer in the network to communicate with any other and any and all can transmit and receive at the same time.

6 Claims, 3 Drawing Sheets

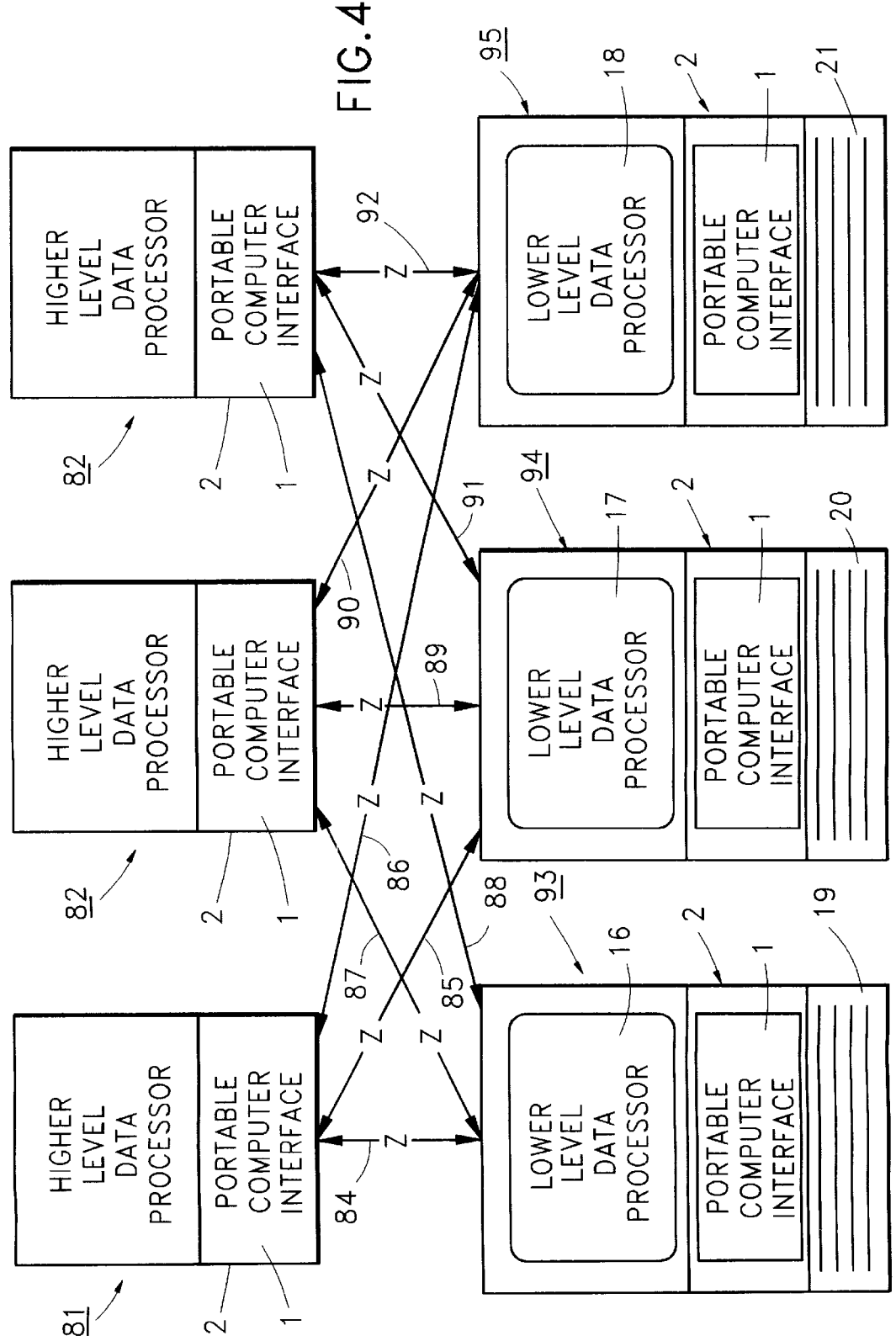

PORTABLE COMPUTER NETWORK

CROSS REFERENCE TO RELATED PATENTS

This invention arose during development efforts related to the subject matter of U.S. patent application Ser. No. 08/739,692 filed Oct. 20, 1996.

FIELD OF THE INVENTION

The invention is directed to a communicating interface for portable type computers for use in a data processing network.

BACKGROUND AND RELATION TO THE PRIOR ART

In computer systems there are evolving, architectural configurations where one or a plurality of computer devices may interact with one or a plurality of other computer devices in a network. All devices generally have interfaces that provide input/output capability for human users. In computer networks it is becoming desirable for any user at any interface to be able to interact with any other device in the network.

The main approach in interconnecting data processing devices has been through cables. The use of cables however places a significant limitation on ability to communicate and on flexibility of physical placement of devices.

The evolution in portable computers has resulted in quite computationally powerful notebook size devices. Such devices however do not readily interface with computer networks.

There have been some attempts heretofore in the art to provide interfacing communication between portable computers and other data processing devices through the use of communication channels not involving wires, such as electromagnetic and optical transmission. An example is in the document IBM TDB Vol. 37 No. 4b April 94 Pages 91–93, wherein there is described, wireless, optical or electromagnetic, communication of data, in packet format, between a computer operating system and a portable computer through an interface that uses as a single transmission criterion, only the presence of the portable computer device in the communication channel.

There is a need in the art for greater flexibility in data processing system architecture to facilitate the use of portable computers in data processing networks.

SUMMARY OF THE INVENTION

The invention provides a communicating or docking interface for a portable computer for use in a network of data processing devices. The docking interface provides interconnecting for wireless communication, battery monitoring and charge maintenance, and input port capability for analog and digital signal type special attachment devices to the portable computer. The communicating interface of the invention permits reliable use of portable computers in a multi level network in which a time and frequency division multiplex communication protocol used through a wireless link and with a data processing device arrangement in levels, permits data exchange between data processing devices to be done in secure data packet type transmissions that can all occur at the same time, individual data processing devices can be turned on and off, added and removed without affecting the system, there is freedom in the physical location of the data processing devices. The invention provides a docking station for the portable computer that includes data interconnection, battery charging and battery level monitoring and sending and receiving wireless signal transmission.

BRIEF DESCRIPTION OF THE DRAWINGS

FIG. 4 is an illustration of the portable computer communication interface of the invention in a network of higher and lower level data processing devices.

DESCRIPTION OF THE INVENTION

Figure 1:
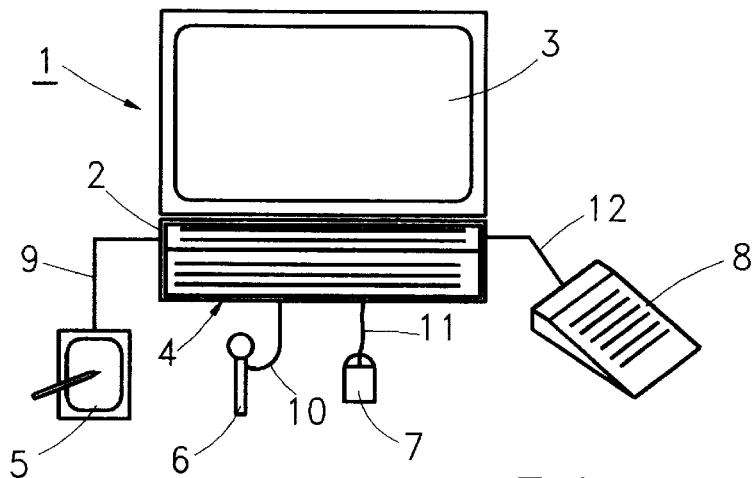
FIG. 1 is an illustration of a portable battery powered computer device positioned in the docking and charging station of the invention with special input attachments.
Figure 2:
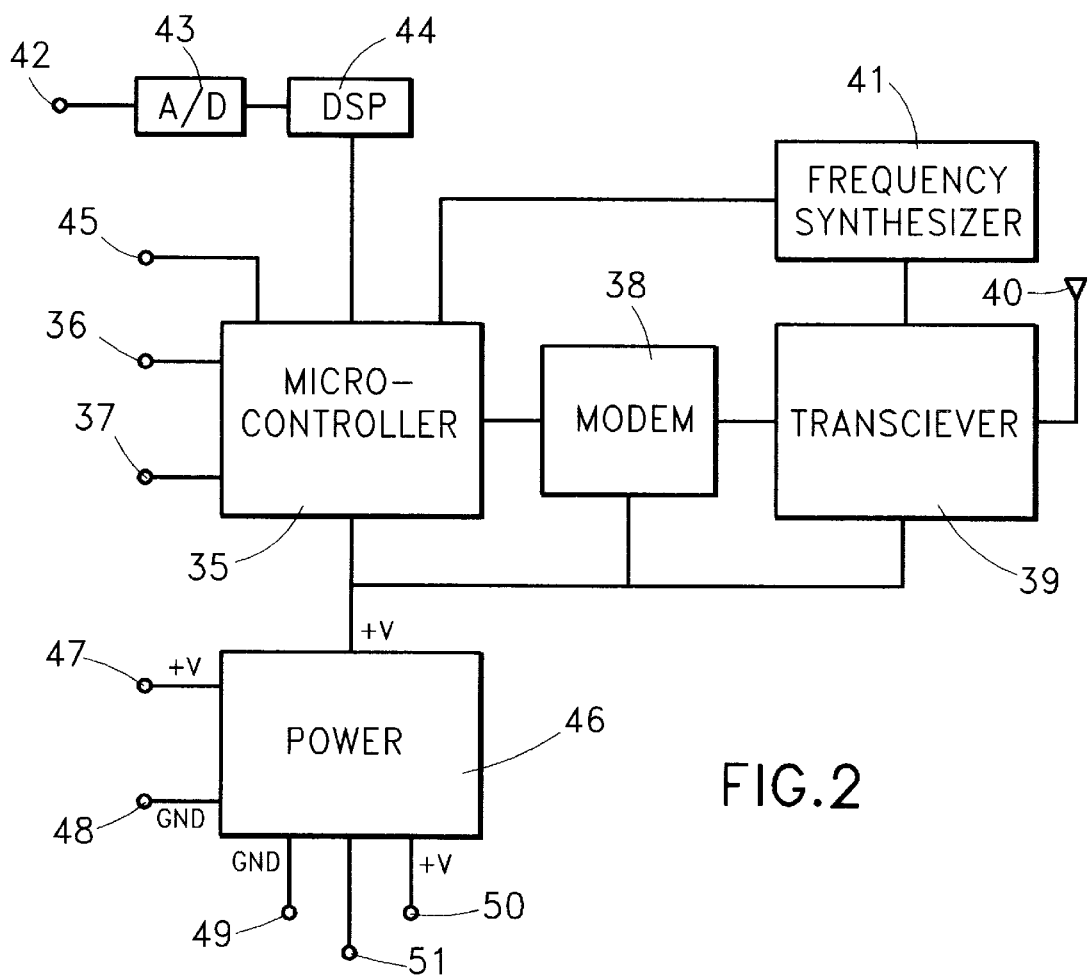
FIG. 2 is an input/output wiring diagram in the portable computer communication interface of the invention device including battery level indication and direct connection features.
Figure 3:
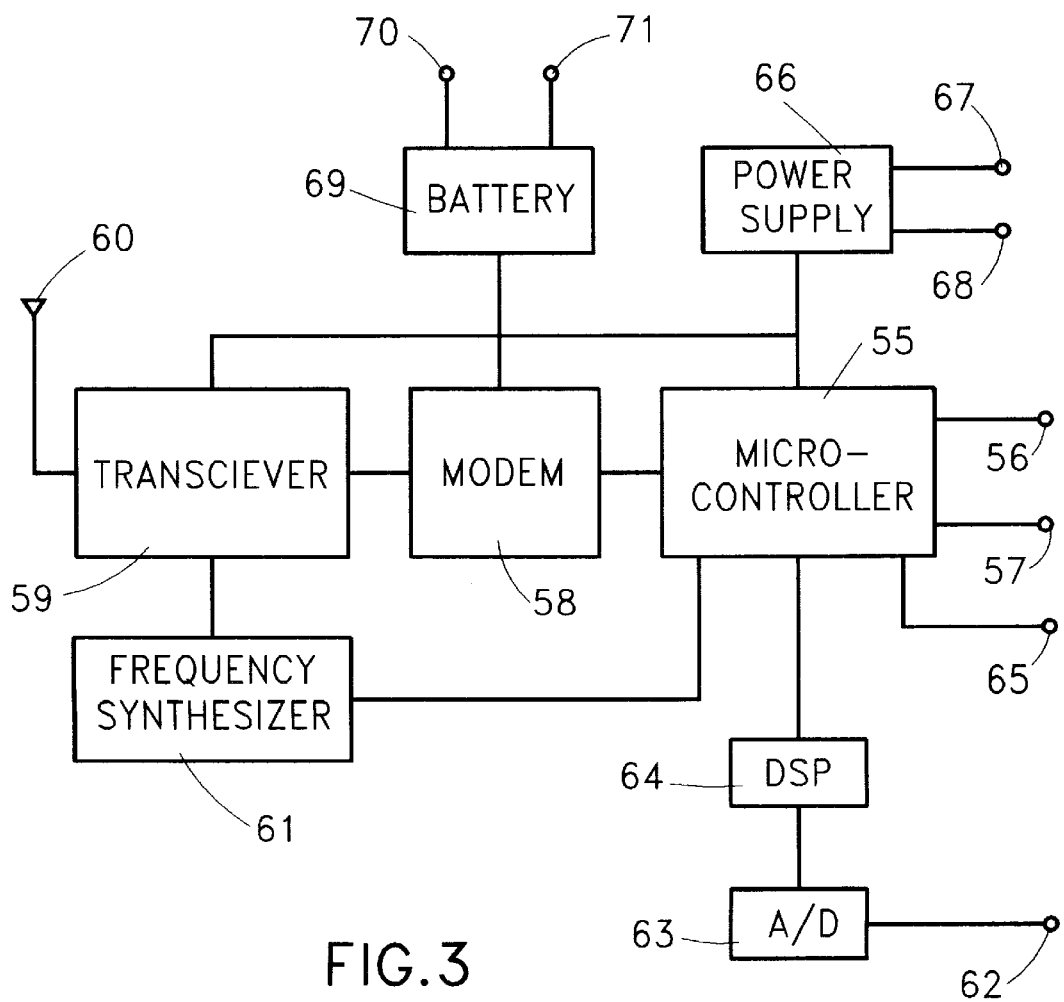
FIG. 3 is an input/output wiring diagram in the portable computer communication interface of the invention for each stand alone portable computer including battery level maintenance and direct connection features.

In the art portable computer devices have reached high levels of computational power but they have limitations where it becomes desirable to incorporate them into a network environment. For portability frequently notebook type computers have relatively small displays and keyboards and for extended use as a user interface a cradle or docking station is employed. The portable computer is inserted into the cradle or docking station which provides larger user interface elements. With some portable computer devices special attachments are being employed to provide as examples graphic or handwriting input, sound including voice input, mouse based cursor and selection input and mathematical pad type input. The special input attachments usually employ cables for communication to the computing device which are frequently incompatible with the docking station. The portable computer is usually battery powered. Where a portable battery powered device is used in larger systems a closer monitoring of battery output level is needed than is usually required for interfacing with the device itself. While the individual operator of a portable computer can usually satisfactorily monitor the battery level, under conditions where the portable computer is being used in a network, there is less feel for how much drain on the battery is taking place and there is less freedom to interrupt. In accordance with the invention a cradling or docking communication interface is provided that accomodates direct connecting of special input attachments and cradling or docking of portable computational devices while providing battery level monitoring and charging with wireless link communication and for initial device information exchange. The interface of the invention is illustrated in connection with FIGS. 1, 2 and 3. FIG. 1 is a depiction of a portable computing device in a cradling or docking station hardware supporting member with special input attachment connections out of sight in the view. FIG. 2 is a functional block diagram of the connection circuitry with battery charging capability and FIG. 3 is a functional block diagram of the connection circuitry with battery monitoring capability.

Referring to FIG. 1 a portable computer 1 is in a cradling or docking supporting housing 2 with a relatively larger display 3, and keyboard 4, than those with which the portable computer is usually provided. Special example input attachments; graphics or handwriting shown as a pad and stylus 5, voice or sound shown as a microphone 6, a mouse 7 and a mathematical pad 8, each respectively connected by a cable 9–12 to a connector, out of sight in this view, that interconnects the cables with the portable computer 1 at the back.

In the invention where the portable computer is being used in a power supplied location the communication circuitry is as illustrated in FIG. 2 made up of a series arrangement including a microcontroller 35 with a data transfer terminal 36 and a clock terminal 37, a modem 38, and wireless signal transciever 39 connected to a combined external signal emission and receiving element 40. The microcontroller 35 and the transciever 39, are controlled by a phase locked loop frequency synthesizer 41 which permits adaptively changing the communicating frequency. Where the wireless transmission is through electromagnetic waves the modem 38 would be an RF modem, the transciever 39 could be but is not limited to an FM transciever and the external emission and receiving element would be an antenna. The 49 Megahertz cordless phone band would be a convenient frequency though any frequency band allowed by a regulatory agency would be suitable. Where the wireless transmission is through optical means the external emission and receiving element 40 would be a light emitting and responsive diode, the transciever 39 and modem 38 would be compatible accordingly. An analog type signal input port 42 from a special attachment device is provided such as from an audio signal with an analog to digital converter (A/D) 43 and a digital signal processor (DSP) 44 the output of which is connected to the microcontroller 35. A port 45 is provided into the microcontroller 35 for all other standard digital signal producing special attachment devices. A charging circuit power element 46 is provided that contains the batteries and provides +V output power to each of the microcontroller 35, the modem 38 and the transceiver 39. The element 46 receives charging power through terminals 47 at +V and 48 at Ground and can supply battery power of the correct level between ground at terminal 49 and +V at terminal 50. A control signal through terminal 51 initiates a battery maintaining charging operation when the signal level deteriorates. The elements 35, 38–41 and 43, 44 and 46 involve standard components in the art. In the instance of a battery powered computer in a stand alone location without external power in a network, typically a peripheral on a lower level, the circuit of FIG. 3 is employed. Referring to FIG. 3 there is a series arrangement made up of a microcontroller 55 with a data terminal 56 and a clock terminal 57, a modem 58, and a wireless signal transciever 59 connected to a combined external signal emission and receiving element 60. The microcontroller 55 and the transciever 59, are controlled by a phase locked loop frequency synthesizer 61, which permits adaptively changing the communicating frequency. Where the wireless transmission is through electromagnetic waves the modem 58 would be an RF modem, the transciever 59 could be but is not limited to an FM transciever and the external emission and receiving element 60 would be an antenna. The 49 Megahertz cordless phone band would be a convenient frequency although any other frequency band allowed by a regulatory agency would also be suitable. Where the wireless transmission is through optical means the external emission and receiving element 60 would be a light emitting and responsive diode, the transciever 59 and modem 58 would be compatible accordingly. An analog type signal input port 62 from a special attachment device is provided such as from an audio signal with an analog to digital converter (A/D) 63 and a digital signal processor (DSP) 64 the output of which is connected to the microcontroller 35. A port 65 is provided into the microcontroller 35 for all other standard digital signal producing special attachment devices. A power supply element 66 is provided that contains the batteries and provides +V output power to each of the microcontroller 55, the modem 58 and the transciever 59. The element 66 receives DC power through terminals 67 at +V and 68 at Ground and can supply power to the battery 69 and power of the correct level between ground at terminal 70 and +V at terminal 71. The elements 55, 58–61 and 63, 64, 66 and 69 involve standard components in the art. The portable computer communicating interface of the invention is particularly useful in connection with a time and frequency division multiplex wireless multiple level computer network as shown in connection with FIGS. 4 and 5. A flexible data processing network is provided in which, a communication protocol through a wireless link together with a data processor communication arrangement in levels, permits data exchange between data processing devices to occur in secure data packet transmissions that can all occur at the same time, individual data processing devices can be turned on and off, added and removed without affecting the system, there is freedom in the physical location of the data processing devices. In accordance with the invention any data processing device location can be occupied by a portable computer. The communication protocol employs a time and frequency division multiplexed communication scheme in each connected higher level data processing device and a plurality of lower level data processing devices. The communication arrangement permits data between portable computers on one network level to be exchanged through portable computer on a higher level through the unique communication channels. All portable computers can exchange data freely at the same time.

The data exchange in the unique channel can employ all the security and transmission reliability features of data packet type data exchange. The wireless link permits establishing a direct unique communication channel between a portable computer on the higher level and all portable computers on the lower level and also permits complete freedom of movement of personal computers to different physical locations. The wireless link may involve electromagnetic wave transmission or radio frequency waves or it may involve higher frequency optical waves. An advantage of electromagnetic wave transmission is that any line of sight or specific length distance requirement between transmitter and receiver is relaxed. The time and frequency division multiplexed channel assignment prevents cross talk among data processing devices. Referring to FIG. 4 an illustration is provided of a network with the data processing device level arrangement and the unique frequency communication channel relationship between the devices. In FIG. 4 members of an example plurality of higher level data processing devices 81, 82 and 83 are depicted as each having a unique channel, shown as -z-, of wireless communication 84–92 with each of an example three 93, 94 and 95 lower level data processing devices. In accordance with this portable computer communicating interface invention all data processing devices can be portable computers 1 in the docking unit 2 as in FIG. 1.

In FIG. 4, a console type user interface involving at least a display and keyboard, not shown, is usually provided at the higher level. Each of the lower level data processing devices 93, 94 and 95 is shown respectively with a display 16, 17 and 18 and a keyboard 19, 20 and 21 as a user interface.

Figure 5:
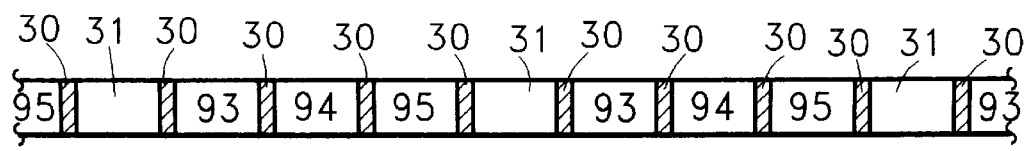
FIG. 5 is a schematic chart of a serial, time division and frequency multiplexed channel communication arrangement in the invention between an upper level data processing device and multiple lower level data processing devices.

In each of the higher level data processing devices 81, 82 and 83 in FIG. 4, there is a resident time division multiplexed communication program as depicted in FIG. 5 that serves as a data transmission gateway for a unique communication channel to each lower level data processing device 93, 94 and 95 in FIG. 4. In the program, time slots are provided serially labelled for the devices 93, 94 and 95 separated by time division separation gaps 30 and at the end of a serial sequence there is a higher level machine processing time slot 31. The serial sequences are repeated throughout the higher level data processing device machine cycle.

In each higher level data processing device 81, 82 and 83 of FIG. 4 there is illustrated respectively a docking element 2 with a portable computer 1 that serves as a communication interface and that includes an internal machine housekeeping programming portion for data packet transmission and receiving and a physical hardware portion for the wireless communication as depicted in FIGS. 2 and 3.

The internal machine housekeeping programming portion of the communication interface includes standard in the art type programming for assignment and recognition of a specific ID of each data processing device in the higher level, assignment and recognition of a specific ID of each data processing device in the lower level, of serially sensing each a specific assigned channel time slot for the first one not in use, of assignment and recognition of transmission frequency, of assignment and recognition of passwords, of assignment and recognition of data packet transmission initialization and termination signals and a buffering of transmitted and received data at times where the higher level data processing device is otherwise engaged.

In operation there is an initialization, usually through the user interfaces, in which each lower level device receives an ID and the ID of each upper level device it is to communicate with, along with the frequency and time slots and security passwords.

The initialization information is exchanged between a higher and a lower level device when the lower level device is actually connected to a higher level such as through a cable. The ability to use the portable computer user interface capabilities is very beneficial in exchanging the initialization information. Once the communication system is in operation all the initialization items can be changed by machine.

At start up the higher level device resets, listens for signals in each channel serially until it finds and selects a quiet or signal free channel at which point it reads from storage all the identification and communication parameters and transmits them through the selected channel. Once the correct system parameters are identified the lower level device synchronizes itself to the communication system. Each data packet exchanged will have higher level ID, lower level ID and password. All three must match for the communication system to respond to the data. When the parameters match between devices data exchange then takes place.

The actual data exchange involves, in the lower level device, in addition to the security identification, a capability for change in the communication parameters, which may occur if it became desirable to change to a different or more than one channel between devices.

At start up the higher level device records all the quiet or signal free channels in memory and it will assign several quiet channels to the lower level devices during initialization. Normally the higher and lower level devices will be communicating using a primary one of the assigned channels. However if either of a pair of communicating devices finds that the primary channel is noisy during operation the communication channel can be switched to another. The data base of quiet channels in the higher level device can be updated continuously.

What has been described is a portable computer communication interface to permit a portable computer to be reliably used in a data processing network. The interface involves communication circuitry, special device inputs, and power monitoring and charging. A flexible portable computer wireless time and frequency division network is formed using the interface of the invention.

What is claimed is:

1. In a portable computer network, the intercommunication method comprising the steps of:

arranging at least one portable computer device in a first network level, arranging at least one portable computer device in a second network level, each said portable computer device on said first and said second network level being a battery powered portable computer positioned in a supporting structure, said supporting structure providing power, electrical connection to data processing and a battery monitoring and charging capability, providing a wireless communication between each said portable computer in said first level and each said portable computer in said second level, each said wireless communication including, in each said portable computer, a sending-receiving series of a microcontroller, a modem, a frequency transciever and an antenna, and, maintaining in each said portable computer device in said first network level a time division multiplexed gated channel assignment program that provides a serially in time communication channel for each said portable computer in said second network level.

2. The intercommunication method of claim 1 wherein said wireless link involves an electromagnetic wave transmission.

3. The intercommunication method of claim 1 wherein said wireless link involves an optical wave transmission.

4. In a portable computer network, an interface for a battery powered portable computer having external data processing and power connections, comprising in combination:

a supporting structure within which said battery powered portable computer is positioned, said supporting structure providing electrical connection to said data processing and power connections of said portable computer, said supporting structure further providing wireless communication and battery maintenance including a sending-receiving series of a microcontroller, a modem, a frequency transciever and an antenna, and, with input capability to said microcontroller for signals from attachment devices for said portable computer.

5. The user interface of claim 4 wherein said wireless communication involves electromagnetic wave transmission.

6. The user interface of claim 4 wherein in said wireless communication including said sending-receiving series of a microcontroller, a modem, a frequency transciever and an antenna, said microcontroller and said frequency transciever are controlled by a phase locked loop frequency synthesizer.

\* \* \* \* \*